No. 640,079. Patented Dec. 26, 1899.
E. D. BANGS.
LUBRICATOR.
(Application filed Mar. 3, 1899.)

(No Model.) 2 Sheets—Sheet 1.

WITNESSES:
H. Walker

INVENTOR
Edwin D. Bangs,
BY
ATTORNEYS.

THE NORRIS PETERS CO., PHOTO-LITHO., WASHINGTON, D. C.

No. 640,079. Patented Dec. 26, 1899.
E. D. BANGS.
LUBRICATOR.
(Application filed Mar. 3, 1899.)
(No Model.) 2 Sheets—Sheet 2.
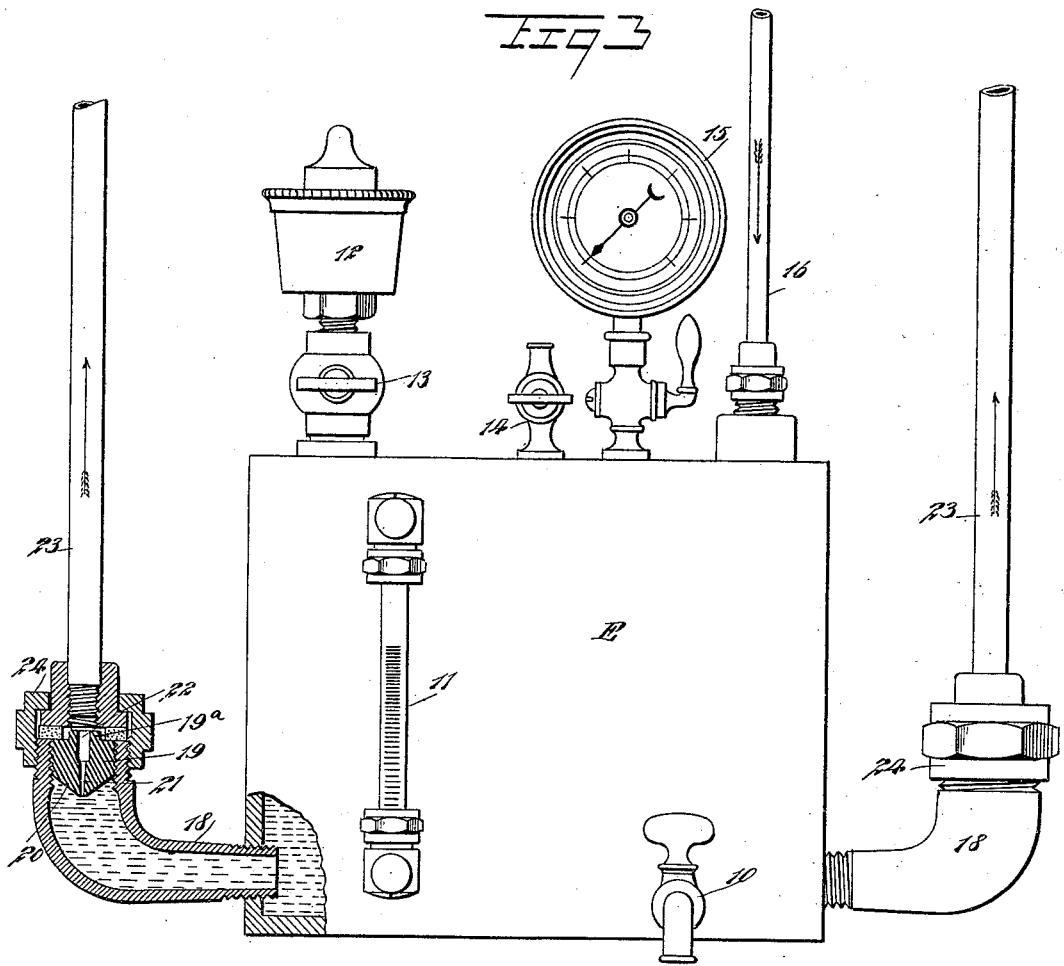
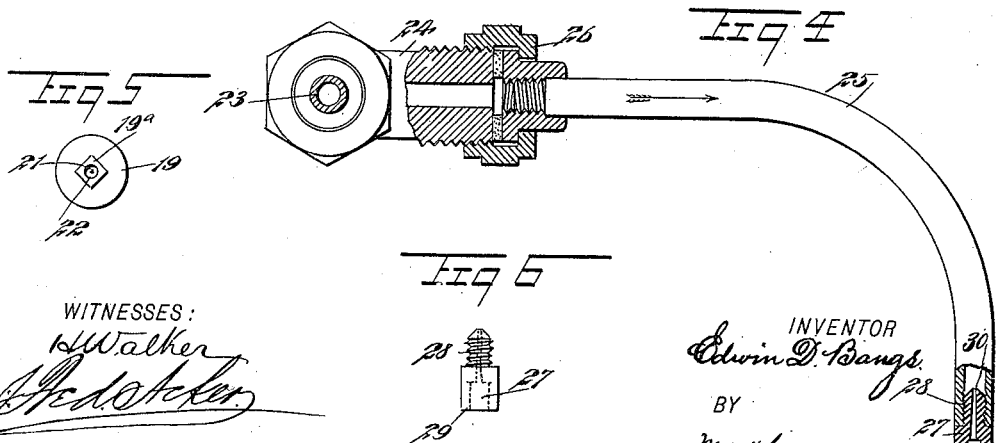
WITNESSES:
INVENTOR
Edwin D. Bangs.
BY
ATTORNEYS.

UNITED STATES PATENT OFFICE.

EDWIN DUNBAR BANGS, OF MILWAUKEE, WISCONSIN.

LUBRICATOR.

SPECIFICATION forming part of Letters Patent No. 640,079, dated December 26, 1899.

Application filed March 3, 1899. Serial No. 707,631. (No model.)

*To all whom it may concern:*

Be it known that I, EDWIN DUNBAR BANGS, of Milwaukee, in the county of Milwaukee and State of Wisconsin, have invented a new and Improved Lubricator, of which the following is a full, clear, and exact description.

The object of my invention is to provide a simple and economic lubricating device especially adapted for supplying lubricating material continuously and regularly to the bearings or journals of locomotive and marine engines and to employ air-pressure to effect such feed.

Another object of the invention is to provide a nozzle for the introduction of oil into the feed-pipes or the exit of oil therefrom, which nozzle will be so constructed that any foreign matter in the lubricating material will not tend to clog the pipes.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
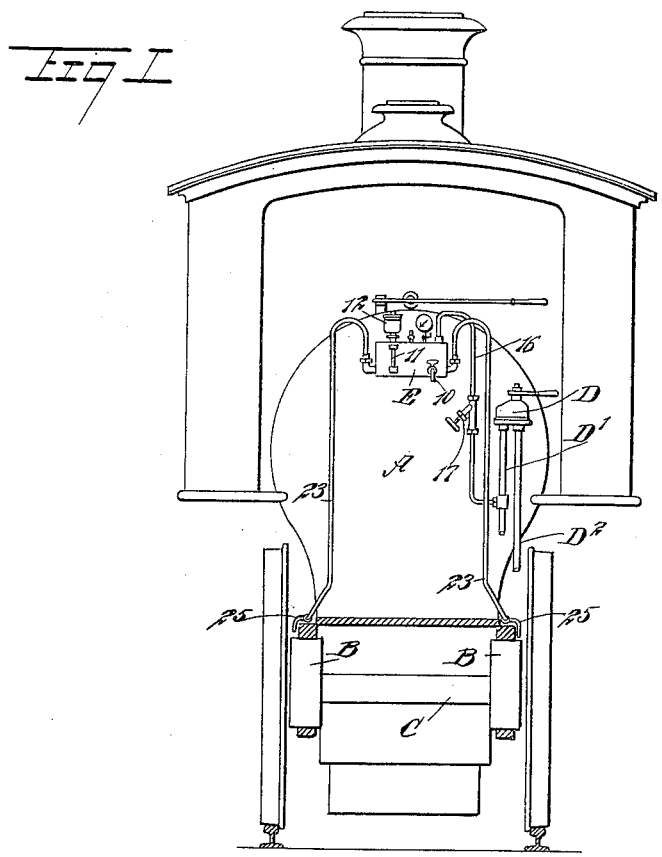
Figure 2:
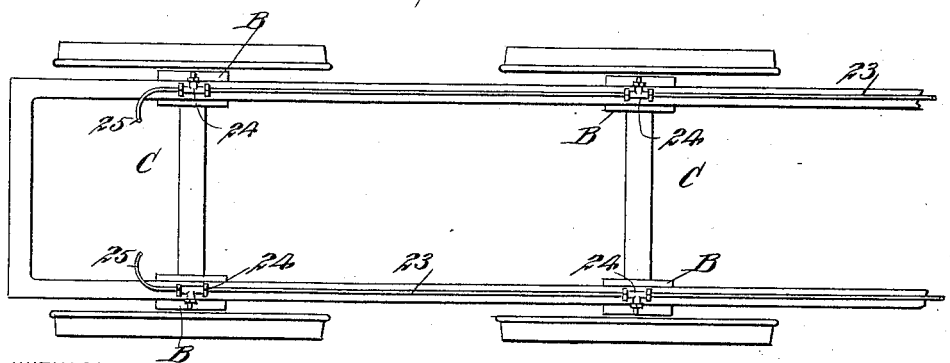

Figure 1 is a rear elevation of a locomotive-cab and a vertical section through the main frame of the engine, illustrating the invention in front elevation as applied to the boiler. Fig 2 is a plan view of a portion of the main frame of the locomotive, showing the manner in which a lubricating material is directed to the bearings. Fig. 3 is an enlarged front elevation of the improved device, parts thereof being in section. Fig. 4 is an enlarged view of a drip-pipe and the coupling for said pipe attaching it to the lubricating-supply pipe, a portion of the drip-pipe being in section and likewise a portion of the coupling. Fig. 5 is a plan view of the nozzle used in connection with the inlet end of a lubricating-supply pipe, and Fig. 6 is a side elevation of a nozzle adapted to be located at the delivery end of the drip-pipe.

A represents the rear end of a locomotive-boiler, and B bearings for the axle of a truck C.

D represents the engineer's valve, and D' the pipe from the air-pressure reservoir leading to said valve, and $D^2$ represents the air-vent for the said engineer's valve, all of which parts may be of ordinary construction.

E represents a tank of any desired shape or of any suitable size adapted to contain lubricating material. Said tank is provided with a faucet at its lower end, whereby its contents may be removed, and the tank is further provided with a gage-glass 11 at the front, whereby the level of the lubricating material in the tank may be readily discerned. The lubricating material is fed into the tank E through the medium of a cup 12, connected with the top portion of the tank, a suitable valve 13 intervening the said cup and tank, and a petcock 14 is also located at the upper portion of the tank to permit the escape of air when the tank is to be supplied with a lubricating material. A gage 15 is also connected with the upper portion of the tank, adapted to indicate the amount of air-pressure in the tank E, the air being delivered into the top portion of the tank above the level of the lubricating material through the medium of a pipe 16, that connects with the pipe D' from the engineer's valve, as shown in Fig. 1, the said air-supply pipe 16 having a valve 17 suitably placed between its ends.

An outlet-pipe 18 is usually connected with each side of the tank E at or near its bottom. These outlet-pipes 18 are shown as of elbow shape and are made tapering, their inner ends being of less diameter than their outlet ends. In connection with each outlet-pipe 18 at its outlet end a nozzle 19 is employed, said nozzle being in the form of a plug having an exteriorly-threaded surface, whereby it may be screwed into the outlet portion of the outlet-pipe. Each nozzle 19 is tapering at its inner end and is provided with a correspondingly-tapered bore 21, extending from the point of the nozzle to a communication with the enlarged opening 22.

Any suitable form of coupling 24 is adapted to connect the outlet end of an outlet-pipe 18 with a lubricating-supply pipe 23, and the lubricating-supply pipe or pipes may be carried over any bearing or box that is to be lubricated, as shown in Fig. 2. Each nozzle 19, as shown in Figs. 3 and 5, is provided with a polygonal upper extension 19ª, through which the enlarged opening 22 is continued, and said extension 19ª enables the nozzle to be manipulated by a wrench or a like tool.

Wherever a bearing or a box B is to be lubricated the supply-pipe 23 is provided, preferably, with a T-fitting 24, as shown in Figs. 2 and 4, and a drip-pipe 25 is coupled in any suitable or approved manner with one member of a T-fitting, the delivery end of a drip-pipe being adapted to extend over the oil-receiving opening of or a cup connected with the bearing or journal to be lubricated.

Each drip-pipe 25 is provided at its delivery end with a nozzle 27, and each of said nozzles consists of an upper reduced and exteriorly-threaded section 28, the upper end whereof is conical, and a base-section 29 of greater diameter than the upper section 28, and when the upper section 28 is screwed into the drip-pipe the delivery end of the drip-pipe will engage with the upper edge of the lower section 29 of the nozzle, as shown in Fig. 4. The reduced section 28 of a nozzle 27 is provided with a tapering bore 30, that extends from the apex of said reduced section into the larger and lower section 29, said bore 30 being of greatest diameter at its lower end, and said bore 30 connects with a chamber 31 in the bottom of the base-section of the nozzle, which chamber is of greater diameter or cross-sectional area than the diameter or cross-sectional area of the outer end of the tapering bore 30.

It will be observed that when nozzles are employed constructed as described the conical portions of the nozzles face the direction of supply, and that if any foreign matter be contained in the lubricating material said foreign matter will be deflected to either side of the nozzle, leaving the bore of the nozzle free, and that if any particle of such foreign matter should be able to enter the contracted end of the nozzle-bore said foreign matter will be forced through the nozzle into the enlarged portion of the bore and from thence outward, thus insuring a continuous and regular supply of lubricating material to any bearing or journal where the nozzles at the end of the drip-pipes or other equivalent pipes may be directed.

I desire it to be understood that any number of drip-pipes may be connected with a supply-pipe and that each drip-pipe employed have the same restricted outlet. Thus the amount of material dispensed by each drip-pipe is the same no matter what relation the drip-pipe may sustain to the source of supply.

Having thus described my invention, I claim as new and desire to secure by Letters Patent—

1. In lubricators a tapering supply-pipe, and a nozzle for the wider end of said pipe, said nozzle being provided with a conical surface facing the inlet of the supply-pipe, said nozzle being furthermore provided with a tapering opening, the contracted end of the opening being its receiving end, said nozzle having also an outlet-chamber in connection with the tapering opening, the said chamber being of greater cross-sectional area than the greatest cross-sectional area of said tapering opening, a coupling at the opposite end of the supply-pipe, and a distributing-pipe connected with the coupling, the distributing-pipe being of less diameter than the supply-pipe and of greater diameter than the nozzle-outlet, as described.

2. The combination, with a reservoir adapted to contain a lubricating material, and tapering outlet-pipes connected with said reservoir, of nozzles located at the outer wider ends of said outlet-pipes, the inner ends of the nozzles being conical, each nozzle being provided with a straight outlet and a tapering inlet the reduced portions whereof are at the points of the nozzles, and distributing-pipes coupled to the supply-pipes at their nozzle ends, said distributing-pipes being of greater diameter than the nozzle-outlets and of less diameter than the delivery ends of the supply-pipes, as described.

3. The combination, with a reservoir adapted to contain a lubricating material, and outlet-pipes connected with said reservoir, of nozzles located at the outer ends of said outlet-pipes, the inner ends of said nozzles being conical, each nozzle being provided with an interior chamber extending through its outer end and with a tapering bore extending from the said chamber to the point of the conical end of the nozzle, the contracted portion of the bore being at said apex, a supply-pipe connected with the outlet-pipes at a point adjacent to the chamber in said nozzle, a series of drip-pipes connected with said supply-pipes and adapted to be carried over journal-boxes, and nozzles located at the ends of the drip-pipes, the inner ends of the nozzles being of conical shape and said nozzles being provided with tapering bores and with outlet chambers in communication with the larger ends of said tapering bores, as specified.

EDWIN DUNBAR BANGS.

Witnesses:
STEWART MURRAY,
EDGAR U. BAKER.